United States Patent Office 3,480,670
Patented Nov. 25, 1969

3,480,670
RESOLUTION OF RACEMIC CHEMICAL COMPOUNDS
Donald F. Reinhold, North Plainfield, Walter A. Gaines, Rahway, and Meyer Sletzinger, North Plainfield, N.J., assignors to Merck & Co., Inc., Rahway, N.J., a corporation of New Jersey
No Drawing. Filed Aug. 11, 1964, Ser. No. 388,952
Int. Cl. C07c *101/08*
U.S. Cl. 260—559　　　　　　　　　　　　4 Claims

ABSTRACT OF THE DISCLOSURE

A process is described for the preparation of L-α-methyl-β-(3,4-disubstituted - phenyl)alanines which comprises resolution of the intermediate corresponding amide and hydrolysis of the L-amide to the amino acid.

---

This invention relates to a process for the preparation of optically active L-α-methyl-3,4-disubstituted - phenylalanines. More specifically, it relates to the synthesis of L-α-methyl-3-methoxy-4 - hydroxyphenylalanine, L - α-methyl-3,4 - dimethoxyphenylalanine, and, particularly, L-α-methyl-3,4-dihydroxyphenylalanine. More specifically, also, it relates to the overall process for the synthesis of L-α-methyl-3,4 - dihydroxyphenylalanine substantially free of the D enantiomorph. Still more specifically, it relates to the process for the preparation of optically active α-amino-α-methyl-β-(3,4-disubstituted phenyl)propionamide, an intermediate in the process for the preparation of the active alanine compounds.

α-Methyl-3,4 - dihydroxyphenylalanine or α - methyl-DOPA, as it is usually called, has been demonstrated to be a potent antihypertensive agent in man. The activity of this compound, which, like all α-amino acids, possesses an asymmetric carbon, is in the L-form. The D-form is completely inactive as an antihypertensive agent, but is equally as toxic as the L-form. It is therefore important to obtain the L-form substantially free of the D-form for use in medicine.

The synthesis of α-methylDOPA, α-methyl 3-methoxy-4-hydroxy or 3,4-dimethoxy phenylalanine usually proceeds from methyl 3-methoxy-4-hydroxybenzyl ketone or 3,4-dimethoxybenzyl ketone (or, to a lesser extent, from methyl dihydroxybenzyl ketones) in one of two ways. Either the ketone is reacted with ammonium carbonate and a cyanide salt to form a hydantoin, which, upon hydrolysis, delivers the corresponding α-methyl methoxy-hydroxy (or dimethoxy or dihydroxy) phenylalanine, or the ketone is reacted with ammonium cyanide to form an α-amino-α-vanillyl (or veratryl or dihydroxybenzyl) propionitrile, which can be hydrolyzed stepwise to the corresponding amide and then either hydrolyzed to the substituted phenylalanine or simultaneously demethylated and hydrolyzed to form the dihydroxyphenylalanine hydrohalide. The hydrohalide is then converted to the free alanine by reaction with a lower alkylene oxide or by cautious neutralization. This synthesis produces the racemic alanine compound, which must then be resolved to the optically active L-form. The resolution at the end of this synthesis results in an accumulation of the unusable D-form, which is not readily degraded to a step in the synthesis where it could be reused.

We have found that the L-alanine compound can be synthesized without the production and accumulation of the D-alanine by running the resolution at the amide stage in the latter synthesis, and thus the racemic amides are the starting materials in our process. We have found that this resolution can be carried out by a direct crystallization of one enantiomorph from a solution of the racemic amide. The D-amide compound thus resolved may be converted to the ketone or aminonitrile and reused in the synthesis of the L-alanine. It is therefore an advantage of this invention that the synthesis from the L-amide compound to the L-alanine compound may be carried out using one-half the amount of amide, as would be needed if the DL-amide were used and the resolution carried out at the end of the synthesis. It is a further advantage that when the methoxy-amide compound is used, the D-form may be degraded to the aminonitrile, which is further along the way toward the synthesis of the alanine compound than is the corresponding ketone.

The starting racemic amide for this invention can be prepared from a methyl vanillyl ketone, a methyl veratryl, or dihydroxybenzyl ketone. The ketone is condensed with ammonia and cyanide ion in any known manner to form the DL-α-amino-α-vanillyl (or veratryl or dihydroxybenzyl)propionitrile. This reaction can be run in any inert solvent. The reaction can be run in water using the bisulfite addition product of the ketone in order to achieve water solubility. The source of cyanide ions may be any water-soluble salt—such as ammonium, potassium, or ammonium cyanide. The aminonitrile is formed in an equilibrium reaction and the most favorable equilibria is obtained below 25° C. It is therefore usually preferred to run this reaction below 25° C. When using isopropanol, the degree of dissociation of the aminonitrile is less than in water, and it is possible to raise the temperature as high as 45° C.

The DL-α-amino-α-vanillyl (or veratryl or dihydroxybenzyl) propionitrile so produced is then converted to the DL-amide hydrohalide by carrying out the hydrolysis with halogen halides. The hydrolysis is preferably carried out between 15–40° C., although higher and lower temperatures can be used. However, when higher temperatures are used under concentrated acid conditions, a greater amount of hydrolysis to the acid as well as demethoxylation will occur. Either hydrochloric acid or hydrobromic acid can be used. One can use any concentration of hydrobromic or hydrochloric acids above 6 or 8 normal, although the more concentrated acid solutions are preferred. The principal effect of using more concentrated acid is to speed up the reaction. The starting DL-amide compound is then prepared by cautious neutralization to remove the hydrohalide and to obtain the free DL-amide base starting material. The L-amide compound used for seeding may be prepared by resolving the propionitrile by any known method and using the L-propionitrile as described above to prepare the L-amide. The DL-α-amino-α-methyl-β-(3,4-disubstituted phenyl)-propionamide starting material may be the 3,4-dimethoxy compound, 3,4-dihydroxy compound, or 3-methoxy-4-hydroxy compound. It is preferred, however, that the starting material be DL-α-amino-α-methyl-β-(3-methoxy-4-hydroxyphenyl) - propionamide. Using this starting material, the preferred optically active alanine compound obtained is L-α-methyl-3-methoxy-4-hydroxyphenylalanine, but especially L-α-methyl-3,4-dihydroxyphenylalanine.

The process of the invention may be illustrated by the following Flow Sheet I:

FLOW SHEET I

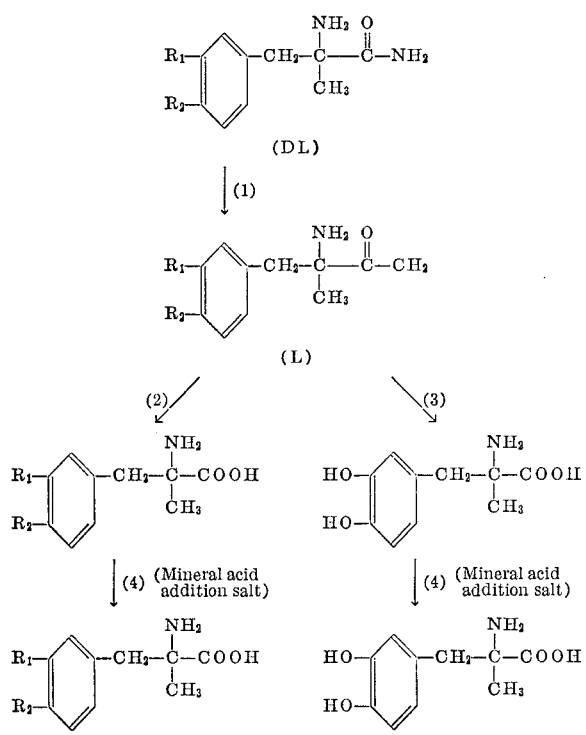

EQUIVALENTS $R_1$ and $R_2$ may each be hydroxy or methoxy.

REACTIONS AND CONDITIONS

Step 1.—Seeding a supersaturated solution in a lower alkanol (such as methanol, ethanol, isopropanol, and the like) or in acetonitrile or in water or in a lower alkyl ketone with crystals of the L enantiomorph.

Step 2.—Hydrolysis with a dilute mineral acid [such as hydrohalic acids, sulfuric acid, phosphoric acid, polyphosphoric acid, and the like, preferably hydrochloric acid or sulfuric acid, but especially an excess of hydrochloric acid (3–4 moles)] at any suitable temperature (10° C. to reflux), preferably above 25° C., but especially at or near the reflux temperature of the system until the reaction is substantially complete. (This step is employed when it is desired to retain the $R_1$ and $R_2$ group during the hydrolysis of the amide to the acid).

Step 3.—Hydrolysis and dealkylation with a mineral acid, preferably a concentrated mineral acid—such as hydrohalic acids (hydrochloric acid or hydrobromic acid), sulfuric acid, phosphoric acid, polyphosphoric acid, and the like, preferably a hydrohalic acid, but especially 3–4 moles of concentrated hydrochloric acid—at any suitable temperature (50–180° C., preferably above 75° C., but especially in a sealed tube at 165–175° C.) until the reaction is substantially complete.

Step 4.—Reaction with a lower alkylene oxide (ethylene oxide, propylene oxide, butylene oxide, and the like) or an inorganic base (such as sodium carbonate, sodium hydroxide, sodium bicarbonate, potassium carbonate, potassium hydroxide, potassium bicarbonate, and the like), preferably a lower alkylene oxide and especially more than one mole of propylene oxide in a solvent inert to the reaction, such as lower ketones (acetone, ethyl ketone, methylethyl ketone, propyl ketone, and the like), ethers (diethyl ether, ethyl-methyl ether, dipropyl ether, and the like), and lower alkanols (methanol, ethanol, propanol, and the like), preferably a lower ketone or lower alkanol (such as acetone or sec-butanol) at any suitable temperature (0–20° C.), but especially acetone or sec-butanol at 0–25° C. until the reaction is substantially complete.

In Step 1, the amide compounds form supersaturated solutions in organic solvents, such as acetonitrile, lower alkanols (such as isopropanol, ethanol, and methanol), both pure and diluted with water, in water alone, and in lower alkyl ketones (such as methylethyl ketone or methylisobutyl ketone); preferably a lower alkanol (such as methanol) or water is used, but especially water. Although direct separation of the pure enantiomorph is preferred, any solvent which permits some enrichment of one enantiomorph may be used, since the enriched product can be recrystallized to give pure product. Such a supersaturated solution is formed in one of several ways: one such is by forming a saturated solution at a slightly elevated temperature and cooling; another is by evaporation of solvent from a saturated solution; a third is by neutralization of a salt of the phenolic hydroxyl, when such is present. The preferred method is to cool a saturated solution until enough supersaturation occurs to permit one enantiomorph to be seeded out independent of the other. This point occurs when supersaturation amounting to about 1–4 gm./liter of one enantiomorph has been reached. Beyond this point, there will occur spontaneous nucleation of both enantiomorphs, which would only be tolerable in batch operation at short residence time. Control of such supersaturation and a cooling method of forming it depends on the slope of the temperature-solubility curve of the solvent. Saturation of the racemate may be carried out at any suitable temperature (0–reflux); however, where possible, it is preferred to saturate slightly above room temperature and subsequently obtain the desired degree of supersaturation by cooling the saturated solution.

The solvents in which supersaturation occurs and, therefore, in which direct resolution can be carried out are the inert lower organic liquid solvents in which the racemic mixture has a solubility greater than 1 gm./liter. One class of these is the lower alkanols, both pure and mixed with themselves or water. These include methanol (both anhydrous and diluted with up to 50 % water), ethanol (from absolute down to about 50% water), isopropanol, secondary butyl alcohol, and the like. Another class is the lower alkyl ketones—such as acetone, methylethyl ketone, and methylisobutyl ketone. Another usable solvent is acetonitrile. Others include dioxane and formamide. Any inert organic solvents dissolving at least one gram of the racemic mixture can be used, but preferably lower organic solvents (i.e., up to about eight carbons) are preferred. The solvents most preferred because of availability as well as utility are methanol or water, especially water. The amides and their resolution and preparation are thus important aspects of our invention as well as the overall process using these steps. The supersaturated solution formed by cooling a saturated solution can be seeded with one enantiomorph, and this causes the crystallization of additional quantities of that enantiomorph, leaving the other enantiomorph still in supersaturated solution.

In the seeding, at least 1% of the weight of the amide in solution is used in the form of crystals of the desired enantiomorph. Preferably a much larger quantity (of the order of 300 gm./liter) is used. The seed area, the fineness of its subdivision, and the time of exposure all control the amount recovered. In addition, also, the extent of supersaturation is a factor. The supersaturated solution can be seeded after it has been formed, or the seed can be added to the saturated solution and the saturated solution cooled (or otherwise treated) to form the supersaturated solution in the presence of the seed.

Reaction Step 3 is employed when at least one of $R_1$ and $R_2$ is methoxy and the dihydroxy compound is the desired final product.

In Steps 2 and 3, the extent of dealkylation of the benzyl substituents is determined by the acid used, the concentration of the acid, and the temperature of the reaction. Therefore, when it is desired substantially to obtain the hydrolysis of the L-amide or when the 3,4-substituents are both hydroxy, as indicated in Step 2, a dilute acid (1–2 N) at or near the reflux temperature of the solvent for a short reaction time is to be used. Although reaction conditions according to Step 3 may be used when the 3,4-substituent is dihydroxy, it is preferred in this case to use the reaction conditions of Step 2. Hydrobromic acid, even in a dilute solution, will readily dealkylate the benzyl substituents, and although alkylated material will remain, the use of hydrobromic acid is not recommended where hydrolysis only is required. To obtain both hydrolysis and dealkylation (Step 3), a strong mineral acid (above 6 N) is used. In this case, although concentrated hydrochloric acid is preferred, hydrobromic acid will serve equally well. When one uses conditions between the extremes of low temperature to reflux, dilute acid to concentrated acid with the various acids indicated, and short to long reatcion time, mixtures of alkylated and dealkylated phenylalanines will be obtained.

In Step 4, it may be desirable to use propylene oxide to neutralize the acid salt which is attached to the amino group, since the chance of alkalizing the solution and thus forming a condition for instability is eliminated.

The following examples are given for purposes of illustration:

EXAMPLE 1

DL-α-amino-α-vanillyl propionitrile

To a solution of 33.2 grams (1.95 moles) of anhydrous ammonia in 850 ml. of isoproponal at 15° C. is added 350 grams (1.95 moles) of vanillyl methyl ketone with agitation. The temperature at this point should not go below 15° C. or the adduct will crystallize from solution. To this solution is added over a 15-minute period with cooling, for the reaction is exothermic, 53 grams (1.95 moles) of hydrogen cyanide. The temperature of the addition is between 15–25° C. The reaction is kept anhydrous and left to stir at 25° C. for 18 hours. During this period, the product crystallizes. After cooling to 0–5° C., the aminonitrile is filtered and washed twice with 100 ml. of cold isopropanol. The white product is dried in vacuo without heat. Yield: 374 grams (03.5%), M.P. 125.–127° C.;

$\lambda_{max.}^{MeOH}$ 2800, E% 144; 2300, E% 325

When veratryl methyl ketone and 3,4-dihydroxyphenyl methyl ketone are used in place of vanillyl methyl ketone in the above example, there are obtained the corresponding propionitriles.

EXAMPLE 2

DL-α-amino-α-vanillyl propionamide

Hydrogen chloride is passed into 50 ml. of 37% hydrochloric acid at −10° C. until 14 grams is dissolved. DL-α-amino-α-vanillyl propionitrile (5.0 grams) is then slowly added and the mixture allowed to react at −10° C. for 8 hours. The solution is then concentrated at room temperature to a syrup and flushed with (2× 5 ml.) t-butanol. The mixture is then filtered and the cake isolated. The cake is then dissolved in 40 ml. of water and filtered. To this filtrate is added 27 ml. of ammonia (as concentrated ammonium hydroxide). The surface of the flask is scratched upon which crystallization begins. The entire mixture is aged in an ice bath for 3 hours. The mixture is then filtered, the cake washed with (2× 5 ml.) t-butanol and finally dried in vacuum; weight=3.0 grams.

Similarly, when DL-α-amino-α-veratryl propionitrile and DL-α-amino-α-3,4-dihydroxyphenyl propionitrile are used in place of the DL-α-amino-α-vanillyl propionitrile in the above example, there are obtained DL-α-amino-α-veratryl propionamide and DL-α-amino-α-3,4 - dihydroxyphenyl propionamide respectively.

EXAMPLE 3

L-α-amino-α-vanillyl propionamide

When the procedure of Example 2 is used, using L-α-amino-α-vanillyl propionitrile in place of the DL-α-amino-α-vanillyl propionitrile, there is obtained L-α-amino-α-vanillyl propionamide, which can be subsequently used for seeding.

Similarly, when L-α-amino-α-veratryl propionitrile and L-α-amino-α-3,4-dihydroxyphenyl propionitrile are used in place of the DL-α-amino-α-vanillyl propionitrile in the above example, there are obtained L-α-amino-α-veratryl propionamide and L-α-amino-α-3,4-dihydroxyphenyl propionamide respectively, which can be used for seeding.

EXAMPLE 4

L-α-amino-α-vanillyl propionamide

To 20 ml. of water is added 10 grams of DL-α-amino-α-vanillyl propionamide and the mixture heated until the amide dissolves. The mixture is then filtered while still hot and the cake washed with 10 ml. of water. The hot filtrate is collected in a vessel containing 0.113 gram of the L-amide enantiomorph cooled to an ambient temperature and aged for 45 minutes. The solid product is isolated by filtration and dried without washing to yield L-α-amino-α-vanillyl propionamide (10% L-rotation gained).

When methanol, ethanol, or 50% water-ethanol is used in place of water in the above example, there is obtained L-α-amino-α-vanillyl propionamide.

Similarly, when DL-α-amino-α-methyl-β-(3,4 - dihydroxyphenyl)-propionamide and DL-α-amino-α-methyl-β-(3,4-dimethoxyphenyl)-propionamide are used in place of DL-α-amino-α-vanillyl propionamide in the above example, there are obtained the respective L-amide enantiomorphs.

When 5.0 grams of the L-amide enantiomorph is used in place of 0.113 gram in the above example, the resonance time is reduced.

EXAMPLE 5

L-α-amino-α-vanillyl propionamide

To 50 ml. water is added 10 grams of DL-α-amino-α-vanillyl propionamide and the mixture warmed to 40° C. The mixture is then filtered while maintaining the temperature as close to 40° C. as possible. To the warm filtrate is added 0.2 gram of the L-amide enantiomorph and the solution cooled to an ambient temperature and aged for 45 minutes. The solid is isolated by filtration and dried to yield the propionamide, enriched in the L-isomer.

EXAMPLE 6

L-α-methyl-3-methoxy-4-hydroxyphenylalanine hydrochloride

A solution of 0.01 mole of L-α-amino-α-methyl-β-(3-methoxy-4-hydroxyphenyl) propionamide in 20 ml. of 2 N hydrochloric acid is refluxed for 3 hours. The solution is concentrated in vacuo to dryness. The residue is flushed twice with 10 ml. of sec-butanol to remove the excess hydrochloric acid and then slurried in 30 ml. of ether and filtered. The crude product obtained is L-α-methyl-3-methoxy-4-hydroxyphenylalanine hydrochloride.

Similarly, when dilute acid and phosphoric acid are used in place of hydrochloric acid in the above example, there is obtained L-α-methyl-3-methoxy-4-hydroxyphenylalanine, sulfate and phosphate salt respectively.

Similarly, when using L-α-methyl-α-amino-β-(3,4-dimethoxyphenyl) propionamide and L-α-methyl-α-amino-β-(3,4-dihydroxyphenyl) propionamide in place of L-α-amino-α-methyl-β-(3 - methoxy - 4 - hydroxyphenyl) propionamide in the above example, there are obtained L-α-methyl - 3,4 - dimethoxyphenylalanine hydrochloride and L-α-methyl-3,4-dihydroxyphenylalanine hydrochloride respectively.

EXAMPLE 7

L-α-methyl-3,4-dihydroxyphenylalanine hydrochloride

A solution of 0.01 mole of L-α-methyl-3-methoxy-4-hydroxyphenylalanine hydrochloride in 20 ml. of 6 N hydrochloric acid is purged with nitrogen and sealed in a glass tube. The tube is then heated at 165–175° C. for 8 hours, at which time the tube is cooled and opened. The solution is then filtered and concentrated in vacuo to dryness. The residue is flushed with (2× 10 ml.) sec-butanol, then slurried in 30 ml. of ether and filtered. The crude product is L-α-methyl-3,4-dihydroxyphenyalanine hydrochloride.

Similarly, when L-α-methyl-3,4-dimethoxyphenylalanine hydrochloride is used in place of L-α-methyl-3-methoxy-4-hydroxyphenylalanine in the above example, there is obtained L-α-methyl-3,4-dihydroxyphenylalanine hydrochloride.

Similarly, when the sulfate and phosphate compounds obtained from Example 6 are used in place of L-α-methyl-3-methoxy-4-hydroxyphenylalanine hydrochloride in the above example, there is obtained L-α-methyl-3,4-dihydroxyphenylalanine hydrochloride.

EXAMPLE 8

L-α-methyl-3,4-dihydroxyphenylalanine hydrochloride

A solution of 0.01 mole of L-α-amino-α-methyl-β-(3-methoxy-4-hydroxyphenyl) propionamide in 20 ml. of 6 N hydrochloric acid is purged with nitrogen and sealed in a glass tube. The tube is then heated at 165–175° C. for 8 hours, at which time the tube is cooled and opened. The solution is then filtered and concentrated in vacuo to dryness. The residue is flushed with (2× 10 ml.) sec-butanol, then triturated in 30 ml. of ether, the ether layer removed, and the residue taken to dryness. The crude product is L-α-methyl-3,4-dihydroxyphenylalanine hydrochloride.

Similarly, when L-α-amino-α-methyl-β-(3,4-dimethoxyphenyl) propionamide is used in place of L-α-amino-α-methyl-β-(3-methoxy-4-hydroxyphenyl) propionamide in the above example, there is obtained L-α-methyl-3,4-dihydroxyphenylalanine hydrochloride.

Similarly, when 10 N hydrochloric acid is used in place of 6 N hydrochloric acid in the above example and the mixture is refluxed for 24 hours, there is obtained L-α-methyl-3,4-dihydroxyphenylalanine hydrochloride.

EXAMPLE 9

L-α-methyl-3,4-dihydroxyphenylalanine

A solution of 5.0 grams of the L-α-amino-α-vanillyl propionamide hydrochloride in 25 ml. of 48% hydrobromic acid is refluxed 16 hours. Paper strip analysis of a sample indicates that the reaction is essentially complete after .5 hour. The solution is concentrated to dryness. The residue is flushed twice with 25 ml. of portions of t-butanol and then dissolved in 25 ml. acetone. The insoluble inorganic salts are removed by filtration. Addition of 1.56 ml. of propylene oxide to the acetone precipitates the α-methyl-DOPA, which, after filtering and drying, weighs 3.4 grams (88.5%), M.P. 296–299° C. U.V. λ max. 280, 220

E%=129

297. [α]₅₄₆ copper salt=+151°.

EXAMPLE 10

L-α-methyl-3,4-dihydroxyphenylalanine

To a solution of 20 grams of L-α-methyl-3,4-dihydroxyphenylalanine hydrochloride in 250 ml. of secondary butanol is added 10 ml. of propylene oxide. The mixture is aged at 25° C. for 5 hours and the precipitated amino acid is filtered, washed with secondary butanol, and dried in vacuo to yield L-α-methyl-3,4-dihydroxyphenylalanine.

When L-α-methyl-3,4-dimethoxyphenylalanine hydrochlorides and L-α-methyl-3-methoxy-4-hydroxyphenylalanine hydrochloride are used in place of L-α-methyl-3,4-dihydroxyphenylalanine hydrochloride in the above example, there are obtained the corresponding phenylalanines.

We claim:
1. A process for preparing an L-amide compound of the formula:

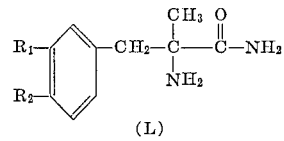

(L)

wherein:

$R_1$ and $R_2$ are each selected from the group consisting of hydroxy and methoxy;
which comprises in combination the steps of:
(a) forming a supersaturated solution of the DL form of the said amide compound in an inert solvent selected from the group consisting of a lower alkanol, a mixture of a lower alkanol and water, and water, in which at least 1 gram of said racemate dissolves per liter of said solvent; and
(b) contacting said DL-supersaturated solution with at least 1% by weight based on the dissolved material of its L-isomer in crystalline form and separating the L-enantiomorph which crystallizes.

2. The process according to claim 1 wherein the starting material is DL-α-amino-α-methyl-β-(3-methoxy-4-hydroxyphenyl) propionamide.

3. A process for preparing an L-amide compound of the formula:

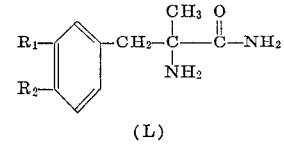

(L)

wherein:

$R_1$ and $R_2$ are each selected from the group consisting of hydroxy and methoxy;
which comprises in combination the steps of:
(a) forming a supersaturated solution of the DL-form of said amide compound in water in which 9 to 15 grams of said racemate is dissolved per liter of water; and
(b) contacting said DL-supersaturated solution with at least 50% by weight based on the dissolved material of its L-isomer in crystalline form and separating the L-enantiomorph which crystallizes.

4. The process according to claim 3 wherein the starting material is DL-α-amino-α-methyl-β-(3-methoxy-4-hydroxyphenyl) propionamide.

References Cited

UNITED STATES PATENTS 2,868,818  1/1959  Pfister et al.

OTHER REFERENCES

Velluz et al., Bull. Soc. Chim. Fr., vol 20, pp. 903–04 (1953).

HENRY R. JILES, Primary Examiner

HARRY I. MOATZ, Assistant Examiner

U.S. Cl. X.R.

260—465, 519, 707